United States Patent
Schwent et al.

(10) Patent No.: US 9,031,579 B2
(45) Date of Patent: May 12, 2015

(54) METHOD AND SYSTEM FOR PROVIDING LOCATION SERVICES

(71) Applicant: MasterCard International Incorporated, Purchase, NY (US)

(72) Inventors: Stephen Schwent, O'Fallon, MO (US); Cliff Ravenscraft, Kirkwood, MO (US)

(73) Assignee: MasterCard International Incorporated, Purchase, NY (US)

( * ) Notice: Subject to any disclaimer, the term of this patent is extended or adjusted under 35 U.S.C. 154(b) by 158 days.

(21) Appl. No.: 13/632,859

(22) Filed: Oct. 1, 2012

(65) Prior Publication Data

US 2014/0094194 A1    Apr. 3, 2014

(51) Int. Cl.
*H04W 4/02* (2009.01)
*G06F 17/30* (2006.01)
*G01C 21/36* (2006.01)

(52) U.S. Cl.
CPC ............ *H04W 4/02* (2013.01); *G01C 21/3679* (2013.01); *G06F 17/30241* (2013.01); *G06F 17/3087* (2013.01)

(58) Field of Classification Search
CPC .. G06F 17/30241; G06Q 30/02; G06Q 50/01; G06Q 30/00; G06Q 30/0205; G06Q 30/0241; G06Q 50/10; G01S 5/0009; H04L 67/18; H04L 67/24; H04W 4/02; H04W 4/025; H04W 64/00; H04W 4/021; H04M 2242/14; H04M 2242/30; H04M 2242/15; H04M 3/42348; H04M 3/4878; H04N 2201/3253
USPC .......... 705/10, 347; 709/227; 455/456, 414.3; 717/100
See application file for complete search history.

(56) References Cited

U.S. PATENT DOCUMENTS

| | | | |
|---|---|---|---|
| 7,536,695 B2 | 5/2009 | Alam et al. | |
| 7,630,986 B1 | 12/2009 | Herz et al. | |
| 8,099,109 B2 | 1/2012 | Altman et al. | |
| 8,208,941 B2 * | 6/2012 | Holm et al. | 455/456.1 |
| 8,311,526 B2 * | 11/2012 | Forstall et al. | 455/414.3 |
| 8,787,937 B2 * | 7/2014 | Moon et al. | 455/456.3 |
| 2003/0172125 A1 | 9/2003 | Batra et al. | |
| 2004/0023666 A1 | 2/2004 | Moon et al. | |
| 2004/0148402 A1 * | 7/2004 | Sato | 709/227 |
| 2005/0216194 A1 * | 9/2005 | Chang | 701/213 |
| 2007/0233635 A1 * | 10/2007 | Burfeind et al. | 707/1 |
| 2008/0133336 A1 | 6/2008 | Altman et al. | |
| 2008/0153517 A1 * | 6/2008 | Lee | 455/457 |
| 2009/0158238 A1 * | 6/2009 | Jung et al. | 717/100 |
| 2009/0275348 A1 | 11/2009 | Weinreich et al. | |
| 2010/0153418 A1 * | 6/2010 | Asher et al. | 707/758 |
| 2010/0250109 A1 * | 9/2010 | Johnston et al. | 701/200 |
| 2011/0184636 A1 * | 7/2011 | Rolf et al. | 701/200 |
| 2011/0289015 A1 * | 11/2011 | Mei et al. | 705/347 |

(Continued)

*Primary Examiner* — Nizar Sivji
(74) *Attorney, Agent, or Firm* — Armstrong Teasdale LLP

(57) ABSTRACT

A computer-implemented method including executing instructions stored on a computer-readable medium is provided. The method includes receiving a request for location services from a user, the request including one or more request parameters. The method also includes formatting the request as a single uniform resource locator (URL) string including the one or more request parameters and transmitting the formatted request to a first of a plurality of geolocation service providers. The method also includes receiving from the first of a plurality of geolocation service providers one or more geographic coordinates related to the request and the one or more request parameters. The method includes outputting the one or more geographic coordinates to the user.

18 Claims, 9 Drawing Sheets

(56) References Cited

U.S. PATENT DOCUMENTS

2012/0044179 A1* 2/2012 Hudson .................. 345/173
2012/0284143 A1* 11/2012 Hunter et al. ............. 705/26.4
2013/0073473 A1* 3/2013 Heath ..................... 705/319
2013/0297556 A1* 11/2013 Chen et al. ............... 707/602

* cited by examiner

METHOD AND SYSTEM FOR PROVIDING LOCATION SERVICES

BACKGROUND OF THE INVENTION

The field of the invention relates generally to providing location-based information through an open application programming interface (API), and more specifically, to network-based methods and systems for providing details of products and services available near or at a particular location through an open API architecture.

Service provider companies provide a variety of services to numerous consumers. These service provider companies utilize computer systems to provide these services. For example, in the cartographic industry, mapping companies develop maps of certain cities, states or nations and update those maps periodically. These companies provide certain maps and map data (e.g., distances, elevations, points of interest) to consumers, navigation companies and other companies in various industries. Oftentimes, these service provider companies provide services that include receiving, processing and storing proprietary data in computer systems managed by the service provider companies. In many cases, access to this proprietary data is restricted to certain approved users. Restricting access to such proprietary data provides at least some protection for the data. However, it also limits the potential uses of the data.

Software developers are able to develop computer programs, sometimes called applications, configured to utilize data such as the data stored within computer systems used by certain service provider companies. Accordingly, in order for these computer programs to use such data, the programs must be able to access the data. One way to access the data stored by these service provider companies is through an open application programming interface (API).

By allowing software developers to access data stored within computer systems used by these service provider companies, the service provider companies are able to leverage these developer applications as well as increase their transaction volume. Thus, by providing this data access to developers, these service provider companies are able to provide additional services to both existing and new customers, which in turn improves the profitability of these companies.

BRIEF DESCRIPTION OF THE INVENTION

In one embodiment, a computer-implemented method including executing instructions stored on a computer-readable medium is provided. The method includes receiving a request for location services from a user, the request including one or more request parameters. The method also includes formatting the request as a single uniform resource locator (URL) string including the one or more request parameters and transmitting the formatted request to a first of a plurality of geolocation service providers. The method also includes receiving from the first of a plurality of geolocation service providers one or more geographic coordinates related to the request and the one or more request parameters. The method includes outputting the one or more geographic coordinates to the user.

In another embodiment, a system for displaying a location of a physical resource is provided. The system includes a first application programming interface (API) configured to receive a request for location services from a user. The request includes one or more request parameters, including a location. The system also includes a second API configured to transmit the request to one or more of a plurality of geolocation service providers. The second API is configured to receive one or more geographic coordinates and associated accuracy ratings related to the request for location services from the user. The second API is configured to parse the request and determine which of the one or more geographic coordinates meet an accuracy threshold. The second API is configured to output geographic coordinates that meet the threshold to the user.

In another embodiment, one or more non-transitory computer-readable storage media having computer-executable instructions embodied thereon for displaying a location of a desired resource using a computer device is provided. The computer device includes a memory device and a processor. When executed by the processor, the computer-executable instructions cause the processor to receive a request for location services from a computer device of a user, determine a location of the computer device of the user, and extract, from the request, a desired resource to be located and a search radius. The instructions also cause the processor to query a database to generate a list of desired resources within the search radius of the location and transmit the list of desired resources to the user.

BRIEF DESCRIPTION OF THE DRAWINGS

FIG. 1 is a schematic system flow diagram of an exemplary system and method for providing location services in accordance with one embodiment of the present invention;

FIG. 2 is another schematic system flow diagram of an exemplary system and method for providing location services in accordance with one embodiment of the present invention;

FIG. 3 is a schematic block diagram of an exemplary embodiment of a user computer device as shown in FIGS. 1 and 2.

FIG. 4 is a schematic block diagram of an exemplary embodiment of a server computer device as shown in FIGS. 1 and 2.

FIG. 5 is a schematic block diagram illustrating the relationship of tables in a database in the system and method of FIG. 1.

FIG. 6 is a schematic system flow diagram of an exemplary method for providing location services.

FIG. 7 is a schematic system flow diagram of a method of geocoding an address for the system and method of FIG. 1.

FIG. 8 is an exemplary schematic system flow diagram of a method of providing location based services for the system and method of FIG. 1.

FIG. 9 is an alternative schematic system flow diagram of a method of providing location based services for the system and method of FIG. 1.

DETAILED DESCRIPTION OF THE INVENTION

Embodiments of the methods and systems described herein provide a user with location services for locating points of interest associated with or near a specific address (i.e., geographic location). In a specific embodiment, requests for location services are received from a user including one or more request parameters. The request is formatted as a single uniform resource locator (URL) string that includes the one or more request parameters. The formatted request is transmitted to a first of a plurality of geolocation service providers. One or more geographic coordinates are received from the geolocation service provider related to the request from the user and the one or more request parameters. Finally, the one or more geographic coordinates are output to the user.

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, systems and methods of providing location services. However, it is contemplated that this disclosure has general application to identifying the location of services in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effect may include at least one of: (a) receiving a request for location services from a user, the request including one or more request parameters; (b) formatting the request as a single uniform resource locator (URL) string including the one or more request parameters; (c) transmitting the formatted request to a first of a plurality of geolocation service providers; and (d) receiving from the geolocation service provider one or more geographic coordinates related to the request from the user and the one or more request parameters; (e) outputting the one or more geographic coordinates to the user.

Figure 1:
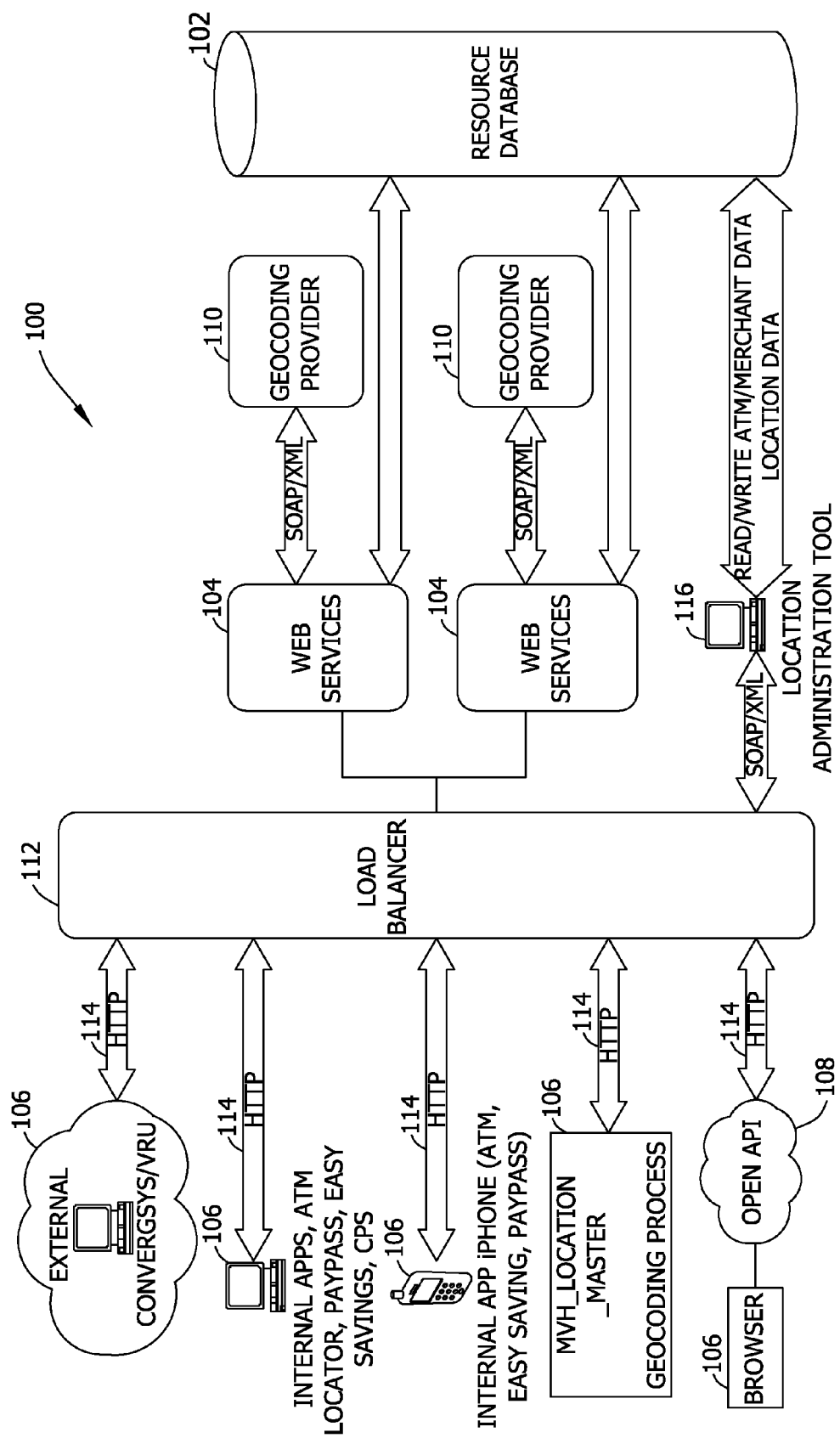
FIGS. 1-9 show exemplary embodiments of the method and system for providing location services described herein.

FIG. 1 is a schematic block diagram of an exemplary embodiment of a location services system 100 configured to distribute location based resources (e.g., data and services) from a resource database 102 to clients 106 through a web services platform (e.g., an application programming interface (API) 104) in accordance with one embodiment of the present invention. Clients 106 can include mobile, web and network based applications, interactive voice response systems, and local applications (e.g., applications local to the network on which the location services system 100 is operating). By providing an open API 108 to access the location services system 100 and locate products and services associated with a particular address, direct access to a potentially proprietary resources database 102 of data and service locations is prevented.

According to an exemplary embodiment, the system 100 receives an address (e.g., a street address, a zip code) and utilizes outside geocoding service providers 110 to convert the address into its associated geographic coordinates (i.e., geolocation). The system 100 can receive an address from a number of different clients 106, including local clients (e.g., clients residing on the same network as the system 100), smartphones and an open API 108. The system 100 compares the geolocation to a resources database with the locations of products and services to determine those products and services located closest to the address, passing the results back to the client for presentation to the requestor (e.g., an individual looking up the nearest automated teller machine (ATM) on a smartphone application).

According to the exemplary embodiment, a variety of types of clients 106 connect to a load balancer 112 via hyper-text transfer protocol (HTTP) 114. Requests received at the load balancer 112 via HTTP 114 are routed to a server where they are sent either to the web services API 104 or to a location administration tool 116. The web services API 104 receives information using a communications protocol. For example, in the exemplary embodiment, the representational state transfer (REST) protocol is employed, which allows clients 106 to call the web service API 104 using a single universal resource locator (URL) and pass in various parameters in that URL. Requests sent to the web services API 104 can include an address along with the type or types of resources the client 106 is requesting. The address can include any address, in any recognized format, for any country, provided the address is capable of being processed by a geolocation provider 110. The products or service can include any product or service indexed to a geolocation and stored in a resource database 102. For example, products and services can include ATMs, Paypass contactless payment method, Prepaid Travel, Easy Savings, and Repower. The resource database can include any product or service that a client may wish to locate, not limited to products and services in the financial services industry.

The web services API 104 uses a communication protocol to send the address to an outside geocoding service provider 110 (e.g., a geolocation request) who converts the address into its associated geographic coordinates and returns those coordinates to the API 110 using a second communication protocol for further processing. An example of the communication protocol includes the simple object access protocol (SOAP XML). An example of the second communication protocol is extensible markup language (REST XML) protocol. In order for the information received by the web services API 104 using the REST protocol to be communicated to the outside geocoding service provider 110, a protocol translation must occur (e.g., a REST to SOAP conversion is performed). An example of a geocoding service provider 110 is Spectrum, commercially available from Pitney-Bowes of Stamford, Conn. If the geocoding service provider 110 cannot provide the associated geographic coordinates for the address (e.g., a "match"), the web services API 104 sends the address to subsequent geocoding service 110 providers for processing until geographic coordinates can be returned to the location services system 100 (See FIG. 6). If the outside geocoding service provider 110 returns geographic coordinates that are not a close match to the address, the location services system 100 sends the address to subsequent geocoding service providers 110 for processing until geographic coordinates that are a close match are returned (e.g., a geolocation response). In the event that no geographic coordinates are returned that are a close match by any of the geocoding service providers 110 available to the location services system 100, the location services system 100 returns an error to the client through the API 104. Once the system 100 has received a valid geolocation response, the location services system 100 communicates that response to the resource database 102, which returns a list of products and services located near the address to the web services API 104, which in turn passes that list onto the client 106.

For example, a request and response flow from a client to the web services API 104 is illustrated below. In the request, an address is provided by the client 106 through a URL (e.g., HTTP 114) in an internet browser. The URL is in the REST protocol. The URL is submitted in the browser through the internet to the load balancer 112, which appropriately routes the URL and passes the URL on to the web services API 104, where a REST to SOAP translation occurs in the XML gateway. The resulting address, now in the SOAP protocol, is processed by outside geocoding service providers 110 until a geolocation response is returned to the web services API 104. The web services API 104 then sends this geolocation response back to the client 106. In order to locate resources associated with the geolocation response, a second request must be made to the web services API 104, which forwards the request onto the resource database. The resource database then returns products and services data associated with the address to the web services API 104, which performs a SOAP to REST translation and passes the information in the REST protocol back to the client's internet browser.

Example

An example of a REST interface call follows for a resource associated with an address:
URL (in REST protocol):

--- http://dev.ws.mastercard.com/locationmanagementservice/services/
NearestLocationsService?locationType=atm&latitude=
38.68838&longitude=-90.44136&radius=10&clientId=atmhunterv1.00

---

This request will find the nearest ATM's in a 10 mile radius around the specific latitude and longitude passed. The "locationType=atm" parameter signifies to the backend service that ATM data is the resource of interest.
An example of the XML response for this call is show below:

---

```
<?xml version="1.0" encoding="UTF-8" ?>
- <locations eventid="0" totalLocationCount="16" locationCount="16"
    start="1" end="16">
- <location id="1569092" distance="0.636605754873927">
- <attributes>
  <attribute key="HANDICAP_ACCESSABLE">0</attribute>
  <attribute key="ADDR_LINE2" />
  <attribute key="LOC_DESC">MASTERCARD
  INT'L (UNBRND)</attribute>
  <attribute key="OWNR_ICA">5313</attribute>
  <attribute key="CITY_NAM">SAINT LOUIS</attribute>
  <attribute key="PRIM_CURR">000</attribute>
  <attribute key="LOCATION_TYPE_DESC">Office
  Building</attribute>
  <attribute key="LOC_TYPE_ID">11</attribute>
  <attribute key="REGN_CD" />
  <attribute key="SPNSR_ICA">5313</attribute>
  <attribute key="CAMERA">0</attribute>
  <attribute key="AVAIL">0</attribute>
  <attribute key="CNTRY_SUBDIVISON_NAM">MO</attribute>
  <attribute key="APRT_CD" />
  <attribute key="RTE_TRNST_NUM">081000032</attribute>
  <attribute key="LOC_ID">1569092</attribute>
  <attribute key="LOC_NAM">MASTERCARD
  INT'L (UNBRND)</attribute>
  <attribute key="METROPOLITAN_AREA_ID" />
  <attribute key="ACCESSIBILITY">0</attribute>
  <attribute key="ATM_ACS_FEE_CD">0</attribute>
  <attribute key="POST_CD">63146</attribute>
  <attribute key="LOC_TYPE_ID">11</attribute>
  <attribute key="GEO_RSLT">S5</attribute>
  <attribute key="CNTRY_CD">USA</attribute>
  <attribute key="SPNSR_NAM">BANKERS BANK, THE</attribute>
  <attribute key="OWNR_NAM">BANKERS BANK, THE</attribute>
  <attribute key="ADDR_LINE1">12115 LACKLAND RD</attribute>
  <attribute key="SHR_DEPST">0</attribute>
  <attribute key="SRCHRG_FREE_ALNC">0</attribute>
  </attributes>
  <name>MASTERCARD INT'L (UNBRND)</name>
  <categoryId>11</categoryId>
- <address>
  <countrySubDivision>MO</countrySubDivision>
  <postalCode>63146</postalCode>
  <street>12115 LACKLAND RD</street>
  <point longitude="-90.443152" latitude="38.697484" />
  <country>USA</country>
  <city>SAINT LOUIS</city>
  <firm/>
  <intersectingStreet/>
  <postalCodeAddOn/>
  <closeMatch>false</closeMatch>
  <name>1</name>
  </address>
```

---

Figure 2:
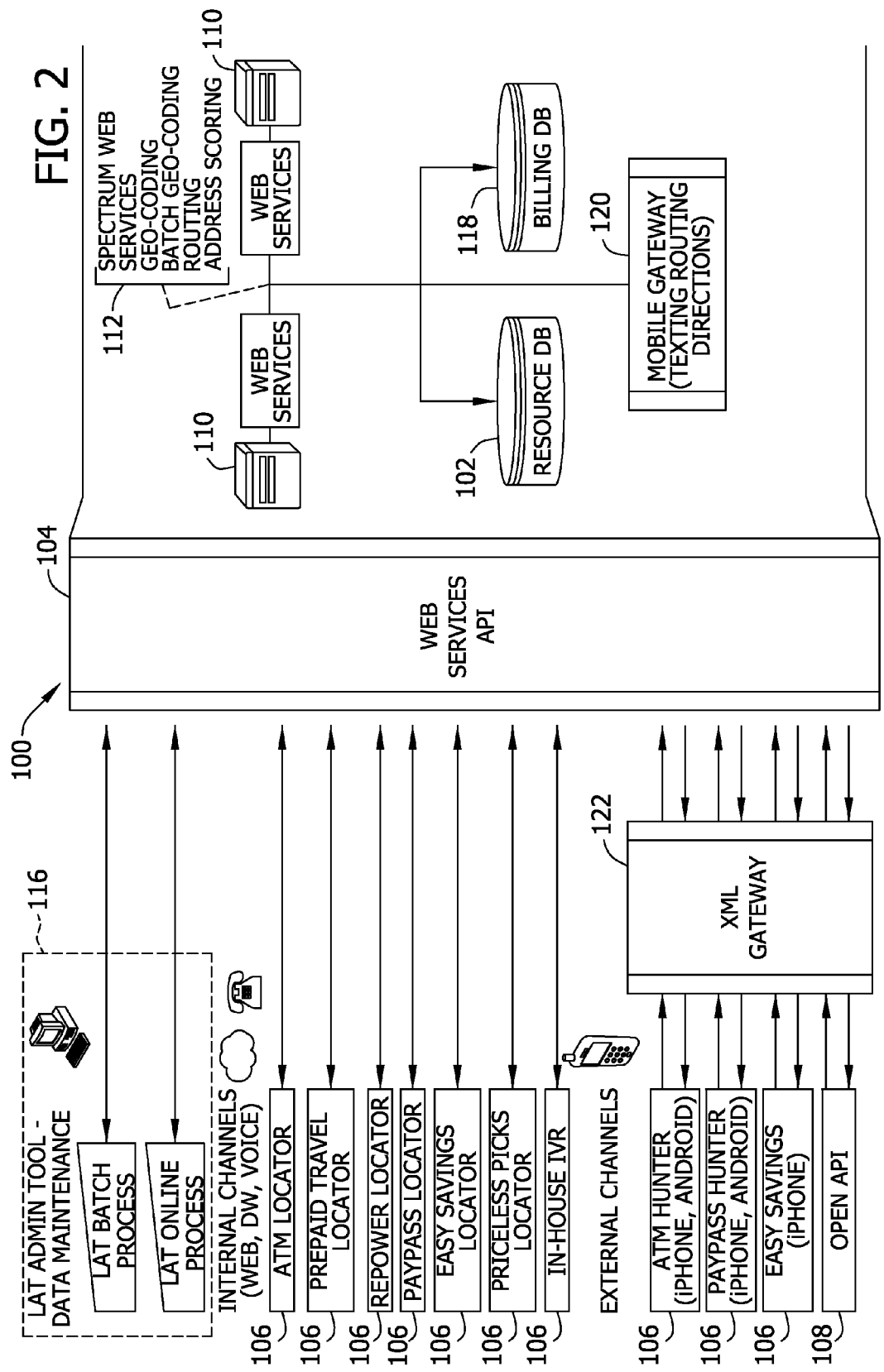

FIG. 2 is another schematic block diagram of an exemplary embodiment of a location services system 100 configured to distribute location based data and services to clients through a web services API 104 with an XML gateway 122. From this diagram, external clients 106 and an open API 108 are shown connecting to web services API 104 through the XML Gateway 122. Internal clients 106 and administration and data maintenance tools 116 connect directly to the API 104. The diagram illustrates the multiple service protocols supported by the location services system 100. Internal clients 106 can connect using SOAP/XML while other external clients 106 (e.g., API clients, smartphone clients) can interface using the XML Gateway 122 architecture. Mobile clients can easily connect to our services layer using the XML Gateway 122 which enables the REST/XML requests and responses described above.

As shown in FIG. 2, clients 106 connect through the web services API 104 to access the load balancer 112, which prioritizes bandwidth and routes requests to the appropriate location. From the load balancer 112, requests of the API 104 (e.g., requests including an address) are routed to a geocoding provider 110 to geocode an address. Once the geocoded address is obtained, the geocoded address and a radius (e.g., a distance around the address for which resources are to be located) is passed to the resource database 102 where a report of resources within the radius is generated. This report can then be passed back through the load balancer 112 and through the web services API 104, or the report can be passed onto a mobile gateway 120 for texting the report to a user. A billing database 118 is used to bill users of the system 100 for the service.

The resource database 102 is a key component in the design of the web services API 104, as the resource database 102 holds all resource data and the location name and address information for that data. The resource database 102 design allows for locations to be shared and specific data sets to be segmented (e.g., such as ATM locations and merchant services locations). A location master table 502 (shown in FIG. 5) holds the basic address information for a particular resource, as well as the latitude and longitude data associated with each resource. The resource attributes (e.g., products and services) are stored in a secondary table (e.g., location attributes 504) (shown in FIG. 5) with a one to many relationship to the location master table 502. This allows for data segmentation.

Figure 3:
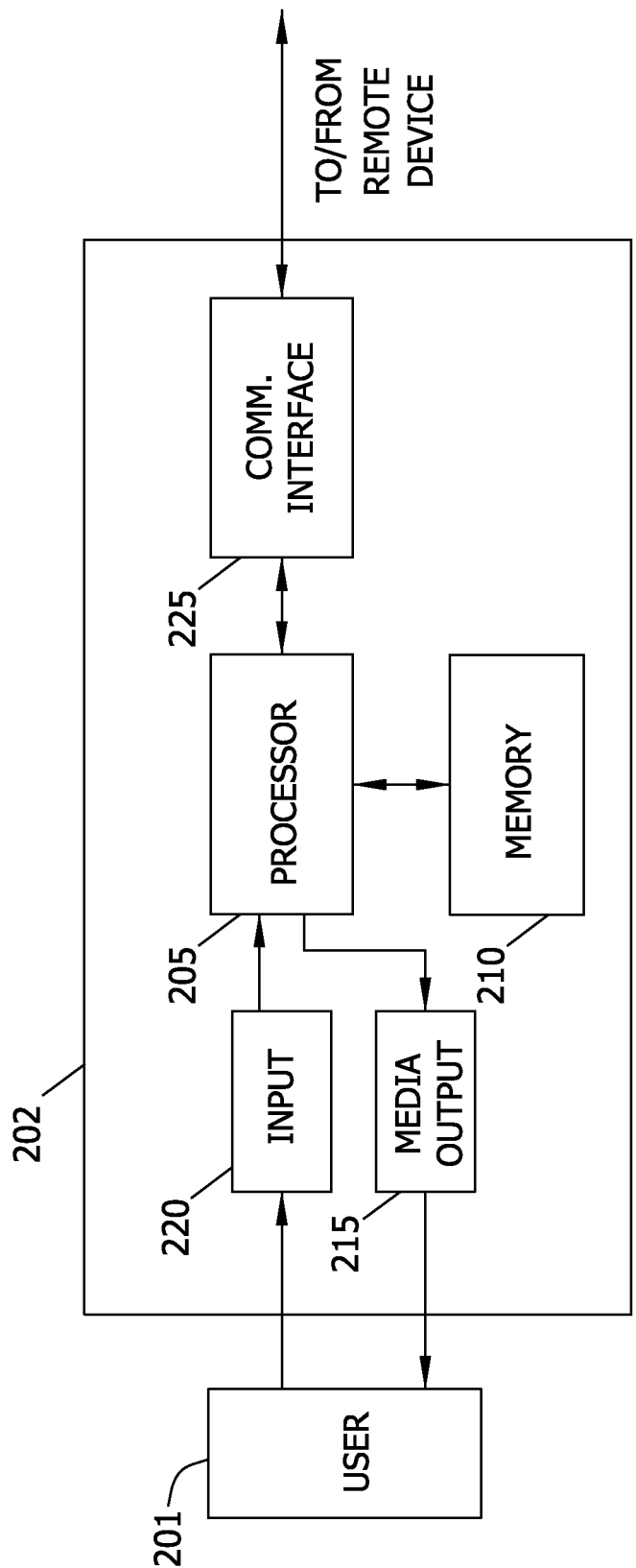

FIG. 3 illustrates an exemplary configuration of a user computer device 202 operated by a user 201. User computer device 202 may include, but is not limited to, clients 106 (shown in FIGS. 1 and 2).

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computer device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which is communicatively couplable to a remote device such as location services system 100. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from location services system 100. A client application allows user 201 to interact with a server application from location services system 100.

Figure 4:
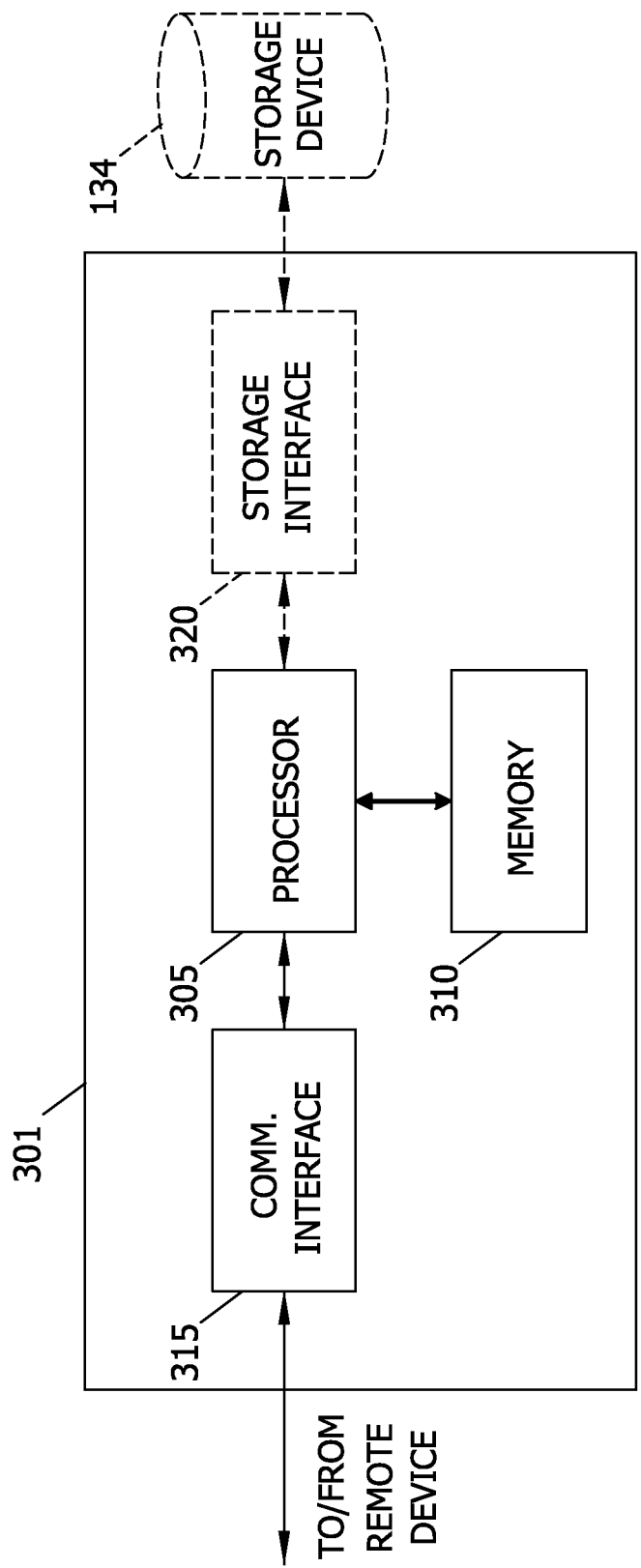

FIG. 4 illustrates an exemplary configuration of a server computer device 301 such as location services system 100 (shown in FIGS. 1 and 2). Server computer device 301 may include, but is not limited to, resource database 102, billing database 118, location administration tool 116, and load balancer 112.

Server computer device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from user computer device 202 via the Internet, as illustrated in FIGS. 1 and 2.

Processor 305 may also be operatively coupled to a storage device 134. Storage device 134 is any computer-operated hardware suitable for storing and/or retrieving data. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
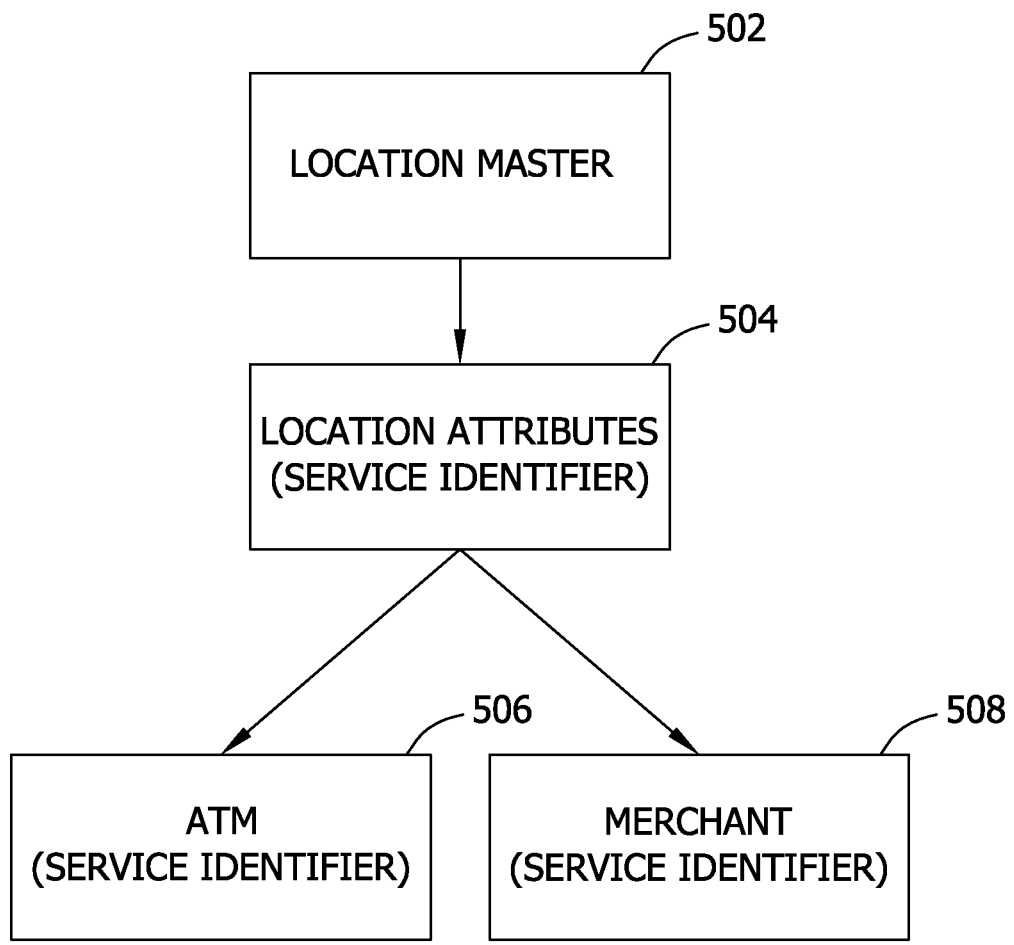

FIG. 5 is a schematic block diagram illustrating the contents and interrelation of the tables in the resource database 102. The location master table 502 is shown linked in a one-to-one relationship with the location attributes table 504 (e.g., secondary table) which is then linked in a one-to-many relationship with all of the products and services located at that particular geolocation, including, for example, an ATM 506 and a merchant 508.

Data segmentation and resource sharing are important to building a resource database 102 with organized, useful data to be passed onto requesting clients 106. The design allows specific datasets to be called upon by the underlying code (e.g., the URL) within the web services layer.

Figure 6:
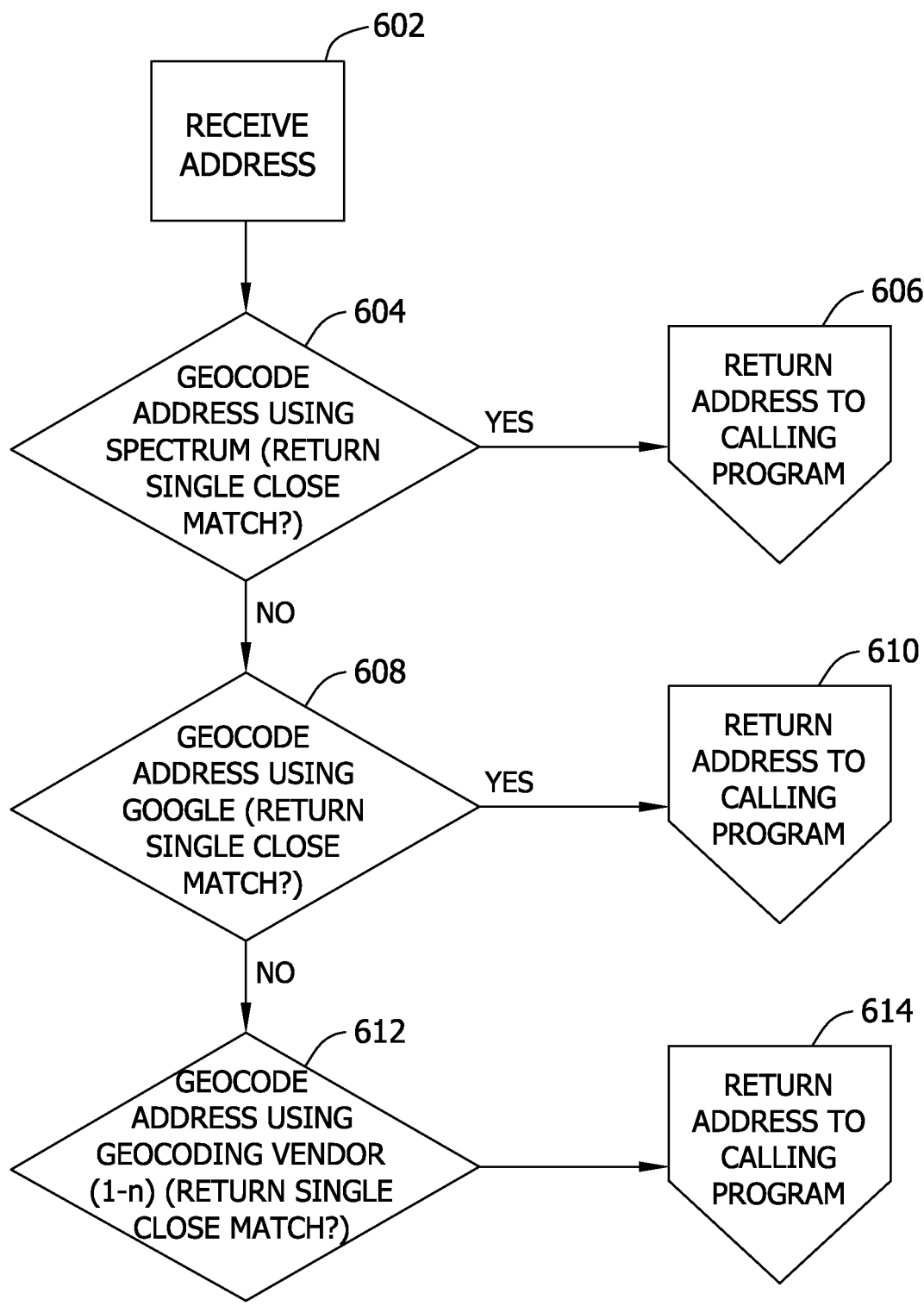

FIG. 6 is a schematic process flow diagram illustrating an exemplary geocoding system employing multiple third party geocoding vendors. The location services system utilizes a geocoding strategy that employs multiple third party geocoding vendors to provide the best possible geocoding match (e.g., latitude and longitude) to clients. The system can handle one or more geocoding vendors within its architecture which enhances the geocoding accuracy and coverage. The flow diagram of FIG. 5 details how received physical addresses 602 (e.g., street addresses) are geocoded within geocoding modules 604, 608, 612. In order to get the best possible geocoding match, only single geocoding matches are accepted from a given geocoding vendor. If the geocoding vendor does not return a single match, an alternative geocoding vendor is used to generate a single match in latitude and longitude form. If a single match to a particular address is not acquired, the system will proceed to poll successive geocoding vendors until no vendors remain. At that point, the location services system redefines its matching criteria to allow the best possible match available from the geocoding vendors to be utilized. Once a latitude and longitude are matched to the physical address, the geolocation is returned to the calling program 606, 610, 614.

Figure 7:
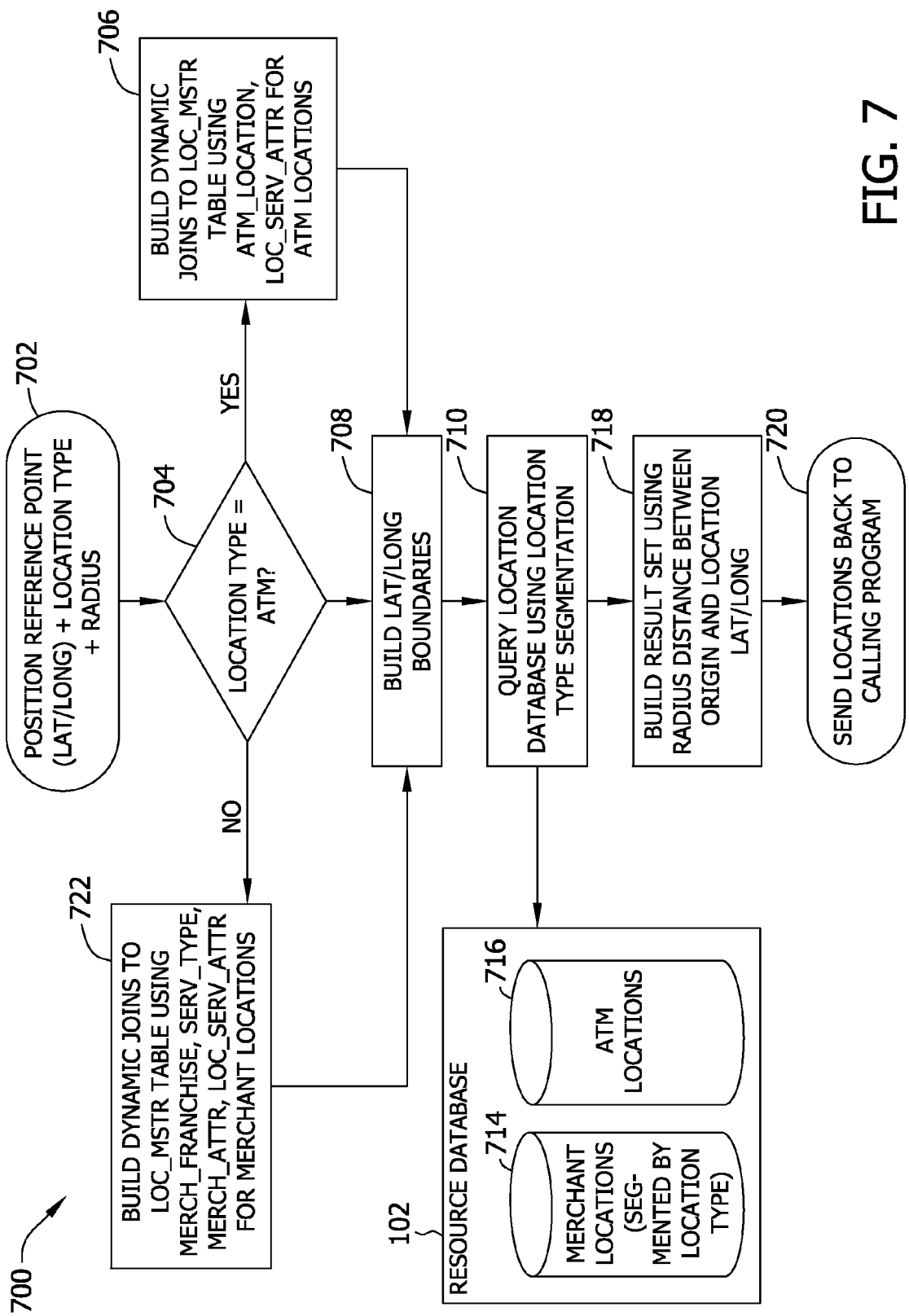

FIG. 7 is a schematic process flow diagram illustrating operation of the resource matching system 700 once a latitude and longitude have been determined from an address passed to the geocoding system. A geocoded address (e.g., in latitude and longitude) is passed 702 to the resource matching system 700 as well as several parameters selected by the client, such as the type of resource being matched to the address and the radius around the address for which to return resources. In the exemplary embodiment, the resource matching system determines 704 whether an ATM is the desired resource. If so, the ATM location segment 716 of the resource database 102 is selected and latitude and longitude boundaries are formed 708 based on the geocoded address and the desired radius. The selected segment of the resource database 102 (e.g., in this case the ATM location segment 716) is queried 710 with the latitude and longitude boundaries to determine which ATMs are located within the boundaries. A result set is then built 718 with all the ATMs inside the latitude and longitude boundaries. The result set includes at least the name of the ATM location and the ATMs physical address. The result set is then sent back 720 to the calling program. In the event that the desired resource is not an ATM, the merchant locations segment 714 of the resource database 102 is selected 722 and latitude and longitude boundaries are formed 708 based on the geocoded address and desired radius. Now, the merchant location segment of the resource database is queried 710 to determine which desired merchant resources fall within the latitude and longitude boundaries. A result set is then built 718 with these results, having at least the name of the merchant resource, its location name and the merchant resource's physical address. For example, if the desired resource is Paypass contactless payment method locations within 10 miles of a given address, the resource matching system will query the merchant location segment of the resource database and create a result set listing Paypass locations within the specified radius. The information is then passed back 720 to the calling program.

Figure 8:
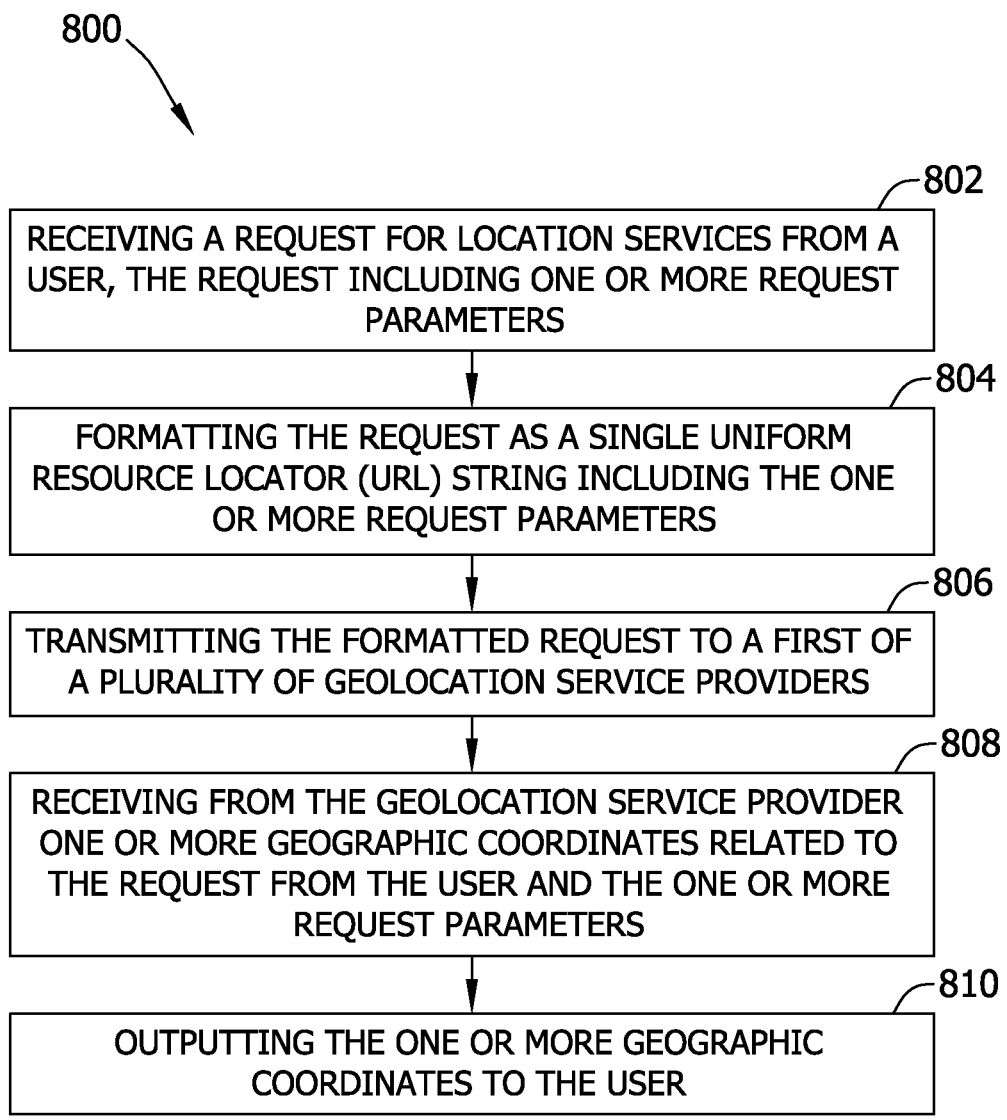

FIG. 8 is an exemplary schematic flow diagram of a method 800 of displaying a location of a physical resource. A computer-implemented method 800 including executing instructions stored on a computer-readable medium is provided. The method includes receiving 802 a request for location services from a user, the request including one or more request parameters. The method also includes formatting 804 the request as a single uniform resource locator (URL) string including the one or more request parameters. The method also includes transmitting 806 the formatted request to a first of a plurality of geolocation service providers. The method also includes receiving 808 from the geolocation service provider one or more geographic coordinates related to the request from the user and the one or more request parameters. The method also includes outputting 810 the one or more geographic coordinates to the user. The one or more request parameters includes a geographical location (e.g., a physical address) and a distance (e.g., a radius around the physical address to locate resources). The one or more request parameters includes a type of resource to be located, such as an entertainment venue, theater, nightclub, restaurant, automated teller machine (ATM), Paypass contactless payment method, Prepaid Travel, Easy Savings, and Repower. The distance comprises a radius from the current geographical location of the user. The method further includes ordering data associated with the one or more geographic coordinates according to the one or more request parameters. The method further includes outputting the data to the user. The request for location services from a user is translated from REST to SOAP before transmitting the formatted request. Outputting the one or more geographic coordinates to the user further includes overlaying the one or more geographic coordinates on a map display to enable the user to visualize the data.

Figure 9:
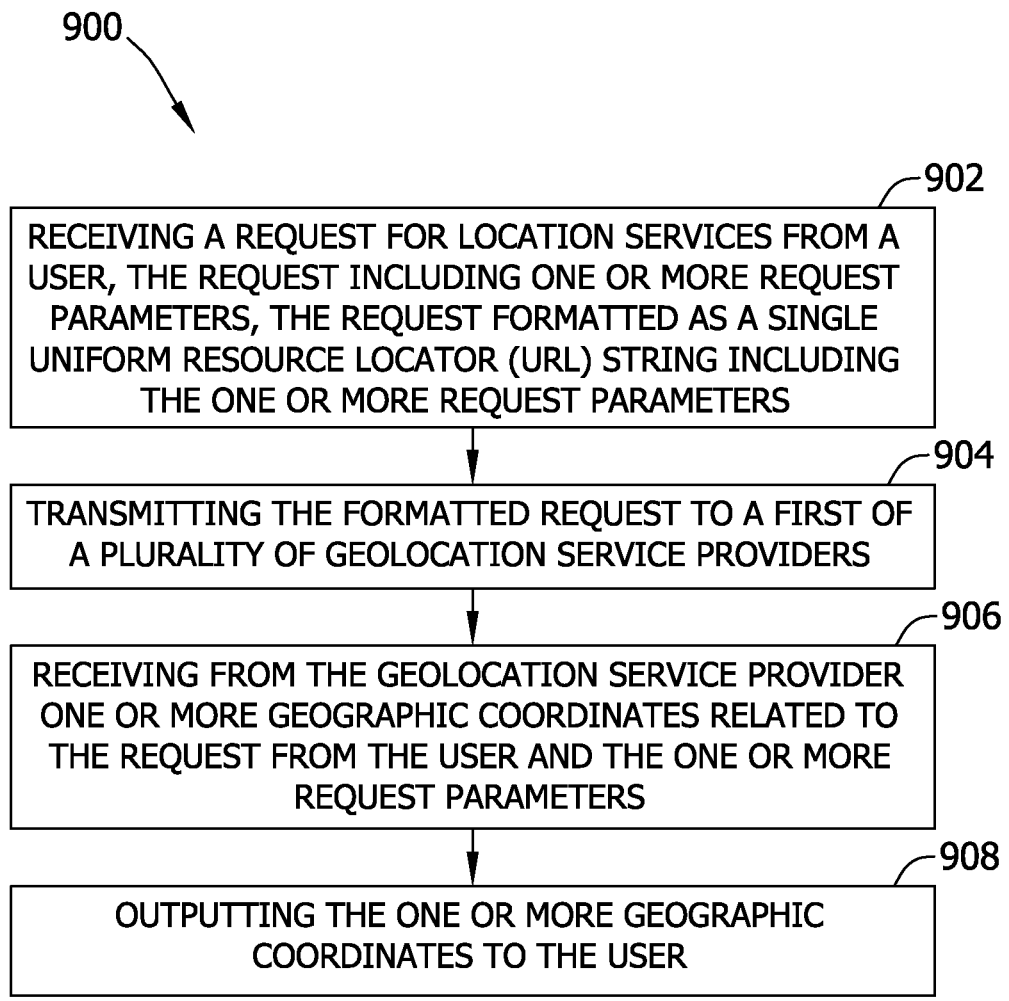

FIG. 9 is an exemplary schematic flow diagram of a method 900 of displaying a location of a physical resource. The method includes receiving 902 a request for location services from a user including one or more request parameters. The request is formatted as a single uniform resource locator (URL) string including the one or more request parameters. The method further includes transmitting 904 the formatted request to a first of a plurality of geolocation service providers. The method further includes 906 receiving from the geolocation service provider one or more geographic coordinates related to the request from the user and the one or more request parameters. The method further includes outputting 908 the one or more geographic coordinates to the user. The method also includes transmitting the formatted request to a subsequent provider of a plurality of geolocation service providers if previously contacted providers are unable to provide one or more geographic coordinates related to the request from the user. The one or more request parameters includes a geographical location and a distance. The one or more request parameters includes a type of resource to be located, such as an entertainment venue, theater, nightclub, restaurant, automated teller machine (ATM), Paypass contactless payment method, Prepaid Travel, Easy Savings, and Repower. The one or more request parameters includes a current geographical location of the user and a distance. The distance comprises a radius from the current geographical location of the user. The method also includes ordering data associated with the one or more geographic coordinates according to the one or more request parameters. The method also includes outputting the data to the user. Outputting the one or more geographic coordinates to the user includes overlaying the one or more geographic coordinates on a map display.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is to provide a user, through an open application programming interface, with location services for locating points of interest associated directly with or near an address provided by the user. A system for geocoding the address is provided which uses at least one geocoding provider to return geographic coordinates that match or closely match the address. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for displaying a location of a physical resource to a user, the method implemented using a computer device coupled to a memory device, the method comprising:
   receiving, by the computer device, from a user computing device, a location of the user, a type of resource to be located, and a search radius;
   transmitting, from the computer device, the user location, formatted as a single uniform resource locator (URL), to a first geolocation service provider;
   receiving, by the computer device, from the first geolocation service provider, a first set of geographic coordinates associated with the user location and a first accuracy rating associated with the first set of geographic coordinates;
   determining that the first accuracy rating fails to satisfy an accuracy threshold;
   identifying, by the computer device, a second geolocation service provider, from which to receive a second set of geographic coordinates having a second accuracy rating that satisfies the accuracy threshold, associated with the user location;
   generating a list of resources, by the computing device, including querying a resource database segment, wherein the resource database segment queried is determined at least in part on the type of resource to be located; and
   outputting the second set of geographic coordinates and the generated list of resources to the user.

2. The method in accordance with claim 1, wherein the type of resource to be located further comprises at least one of an entertainment venue, theater, nightclub, restaurant, automated teller machine (ATM), Paypass contactless payment system, Prepaid Travel, Easy Savings, and Repower.

3. The method in accordance with claim 1, wherein the list of resources is restricted to a search area defined from latitude and longitude boundaries based at least in part on the search radius, and using the second set of geographic coordinates as the center of the search area.

4. The method in accordance with claim 1, wherein outputting the second set of geographic coordinates to the user comprises overlaying the second set of geographic coordinates on a map display.

5. A method in accordance with claim 1, wherein the accuracy threshold is set to accept a set of geographic coordinates that have an accuracy rating signifying a close match between the user location and the set of geographic coordinates.

6. A method in accordance with claim 1, wherein the accuracy rating signifies one of a close match, an approximate match, and no match between the user location and the set of geographic coordinates.

7. A computer system for displaying a location of a physical resource to a user, said computer system comprising:
   a processor;
   a memory in communication with the processor;
   a first application programming interface (API) configured to receive a location of the user, a type of resource to be located, and a search radius; and
   a second API configured to:
     transmit the user location, formatted as a single uniform resource locator (URL) to a first geolocation service provider;
     receive, from the first geolocation service provider, a first set of geographic coordinates associated with the user location, and a first accuracy rating associated with the first set of geographic coordinates;
     determine that the first accuracy rating fails to satisfy an accuracy threshold;
     identify a second geolocation service provider, from which to receive a second set of geographic coordinates having a second accuracy rating that satisfies the accuracy threshold, associated with the user location;
     generate a list of resources, including querying a resource database segment, wherein the resource database segment queried is determined at least in part on the type of resource to be located; and
     output the second set of geographic coordinates and the list of resources to the user.

8. The system of claim 7, wherein the type of resource to be located further comprises at least one of an entertainment venue, theater, nightclub, restaurant, automated teller machine (ATM), Paypass contactless payment system, Prepaid Travel, Easy Savings, and Repower.

9. The system of claim 7, wherein the list of resources is restricted to a search area defined from latitude and longitude boundaries based at least in part on the search radius, and using the second set of geographic coordinates as the center of the search area.

10. The system of claim 7, wherein the accuracy threshold is set to accept a set of geographic coordinates that have an accuracy rating signifying a close match between the user location and the set of geographic coordinates.

11. The system of claim 7, wherein the accuracy rating signifies one of a close match, an approximate match, and no match between the user location and the set of geographic coordinates.

12. The system of claim 7, wherein outputting the second set of geographic coordinates to the user comprises overlaying the second set of geographic coordinates on a map display.

13. One or more non-transitory computer-readable storage media having computer-executable instructions embodied thereon for displaying a location of a physical resource to a user, using a computer device, wherein the computer device includes a memory device and a processor, wherein when executed by said processor, said computer-executable instructions cause said processor to:
   receive, from a user computing device, a location of the user, a type of resource to be located, and a search radius;
   transmit the user location, formatted as a single uniform resource locator (URL), to a first geolocation service provider;
   receive, from the first geolocation service provider, a first set of geographic coordinates associated with the user location and a first accuracy rating associated with the first set of geographic coordinates;
   determine that the first accuracy rating fails to satisfy an accuracy threshold;
   identify a second geolocation service provider from which to receive a second set of geographic coordinates having a second accuracy rating that satisfies the accuracy threshold, associated with the user location;

generate a list of resources, including querying a resource database segment, wherein the resource database segment queried is determined at least in part on the type of resource to be located;

output the second set of geographic coordinates and the generated list of resources to the user.

14. The one or more non-transitory computer-readable storage media in accordance with claim 13, wherein the computer-executable instructions further cause the processor to overlay the list of resources on a map.

15. The one or more non-transitory computer-readable storage media in accordance with claim 13, wherein the type of resource comprises at least one of an entertainment venue, theater, nightclub, restaurant, automated teller machine (ATM), Paypass contactless payment system, Prepaid Travel, Easy Savings, and Repower.

16. The one or more non-transitory computer-readable storage media in accordance with claim 13, wherein the accuracy threshold is set to accept a set of geographic coordinates that have an accuracy rating signifying a close match between the user location and the set of geographic coordinates.

17. The one or more non-transitory computer-readable storage media in accordance with claim 13, wherein the accuracy rating signifies one of a close match, an approximate match, and no match between the user location and the set of geographic coordinates.

18. The one or more non-transitory computer-readable storage media in accordance with claim 13, wherein the list of resources is restricted to a search area defined from latitude and longitude boundaries based at least in part on the search radius, and using the second set of geographic coordinates as the center of the search area.

* * * * *